(12) United States Patent
Burton et al.

(10) Patent No.: US 7,758,306 B2
(45) Date of Patent: Jul. 20, 2010

(54) TURBINE ASSEMBLY FOR A GAS TURBINE ENGINE AND METHOD OF MANUFACTURING THE SAME

(75) Inventors: Scott Andrew Burton, Cincinnati, OH (US); Chander Prakash, Cincinnati, OH (US); Joseph Machnaim, Bangalore (IN); David Glenn Cherry, Loveland, OH (US); Robert John Beacock, Cincinnati, OH (US); Ching-Pang Lee, Cincinnati, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 11/615,514

(22) Filed: Dec. 22, 2006

(65) Prior Publication Data

US 2008/0148564 A1    Jun. 26, 2008

(51) Int. Cl.
  *F01D 1/02*  (2006.01)
(52) U.S. Cl. .................................. 415/209.1; 415/199.5
(58) Field of Classification Search ................. 415/191, 415/199.5, 209.1, 211.2
See application file for complete search history.

(56) References Cited

U.S. PATENT DOCUMENTS

| | | | |
|---|---|---|---|
| 3,745,629 A * | 7/1973 | Pask et al. ............... | 29/889.22 |
| 4,768,924 A | 9/1988 | Carrier et al. | |
| 5,044,879 A | 9/1991 | Farrar | |
| 5,482,433 A * | 1/1996 | Norris et al. ............. | 415/173.7 |
| 5,513,955 A | 5/1996 | Barcza | |
| 6,431,820 B1 | 8/2002 | Beacock et al. | |
| 6,538,887 B2 | 3/2003 | Belady et al. | |
| 6,554,564 B1 * | 4/2003 | Lord .......................... | 415/119 |
| 6,719,528 B2 | 4/2004 | Kuno et al. | |
| 6,895,755 B2 | 5/2005 | Steinthorsson et al. | |
| 6,969,232 B2 | 11/2005 | Zess et al. | |
| 7,121,792 B1 * | 10/2006 | Fessou et al. ............... | 415/191 |
| 2008/0131271 A1 * | 6/2008 | Wood et al. ................. | 415/191 |

FOREIGN PATENT DOCUMENTS

EP    1939405 A2    7/2008

OTHER PUBLICATIONS

European Patent Office, Search Report for Application No. 07123147.6, Apr. 9, 2010, 8 pages, EP.

* cited by examiner

*Primary Examiner*—Edward Look
*Assistant Examiner*—Ryan H Ellis
(74) *Attorney, Agent, or Firm*—William Scott Andes, Esq.; Armstrong Teasdale LLP

(57) ABSTRACT

A turbine assembly for a gas turbine engine. The turbine assembly includes at least one stator assembly including a radially inner band and at least one stator vane that extends radially outward from the inner band. The stator vane includes an airfoil having a root portion adjacent to the inner band and a tip portion. The airfoil also includes at least one lean directional change that is defined between the root portion and the tip portion. The turbine assembly also includes at least one turbine blade assembly that includes at least one rotor blade. The blade assembly is coupled in flow communication with the stator assembly such that an axial spacing is defined therebetween. The axial spacing defined adjacent to the at least one lean directional change is wider than the axial spacing defined adjacent to the root portion.

19 Claims, 14 Drawing Sheets

TURBINE ASSEMBLY FOR A GAS TURBINE ENGINE AND METHOD OF MANUFACTURING THE SAME

BACKGROUND OF THE INVENTION

This invention relates generally to gas turbine engines, and more specifically to turbine nozzle assemblies in gas turbine engines.

In at least some known gas turbine engines, combustion gases flow through a high-pressure turbine and a low-pressure turbine to generate torque, which powers the upstream compressor and fan. In at least some known low-pressure turbine assemblies, the low-pressure turbine is rotatably coupled to a front fan assembly. Stator vanes in the low-pressure turbine channel combustion gases downstream towards a row of rotating turbine blades. The gas flow induces rotation to the turbine blades which causes rotation of the front fan assembly.

The flowfield of the combustion gases that travel through the turbines can be complex. For example, portions of the outer surfaces of the vanes, blades, and/or other components of the turbine assembly may induce secondary flows in the combustion gases that are perpendicular to the direction of the core flow. Such secondary flows may cause an undesirable loss in pressure and a reduction in engine efficiency. Optimizing the surroundings of the flowfield may facilitate reducing pressure losses and improving engine efficiency.

BRIEF DESCRIPTION OF THE INVENTION

In one aspect, a method for assembling a gas turbine engine is provided. The method includes coupling at least one stator assembly within the turbine engine. The at least one stator assembly includes at least one stator vane extending from an inner band within the gas turbine engine, wherein the stator vane extends from a root portion radially outward to a tip portion. The stator vane includes at least two lean directional changes defined between the root portion and the tip portion. The method also includes coupling at least one turbine blade assembly within the turbine engine. The turbine blade assembly includes at least one rotor blade in flow communication with the stator assembly such that an axial spacing is defined between the rotor blade and the stator vane. The axial spacing defined at one of the lean directional changes is wider than the axial spacing defined at the root portion.

In another aspect, a turbine assembly for a gas turbine engine is provided. The turbine assembly includes at least one stator assembly including a radially inner band and at least one stator vane that extends radially outward from the inner band. The stator vane includes an airfoil having a root portion adjacent to the inner band and a tip portion. The airfoil also includes at least one lean directional change that is defined between the root portion and the tip portion. The turbine assembly also includes at least one turbine blade assembly that includes at least one rotor blade. The blade assembly is coupled in flow communication with the stator assembly such that an axial spacing is defined therebetween. The axial spacing defined adjacent to the at least one lean directional change is wider than the axial spacing defined adjacent to the root portion.

In another aspect, a multi-stage turbine assembly is provided. The turbine assembly includes a first stage including a first blade assembly that is coupled downstream from a first stator assembly. The stator assembly includes at least one stator vane including an airfoil that has a root portion, a tip portion, and at least one of a lean directional change and a sweep directional change defined between the root portion and the tip portion. The first blade assembly includes at least one rotor blade. The turbine assembly also includes a second stage including a second blade assembly that is coupled downstream from a second stator assembly that includes at least one stator vane. The stator vane includes an airfoil having a root portion, a tip portion, and at least one of a lean directional change and a sweep directional change defined between the root portion and the tip portion. The second blade assembly includes at least one second rotor blade. The first stage is coupled upstream from the second stage such that an axial spacing is defined therebetween. The axial spacing includes a plurality of axial spacing changes.

DETAILED DESCRIPTION OF THE INVENTION

The present invention provides a method, components, and assembly that facilitate reducing secondary flows in gas turbine engines, such that engine efficiency is facilitated to be increased. Although embodiments discussed herein include stator vanes, turbine assemblies, gas turbine engines, and methods of manufacturing the same, those having ordinary skill in the art will appreciate that the present invention is not limited to use with gas turbine engines or any of the exemplary embodiments described or illustrated herein.

Figure 1:
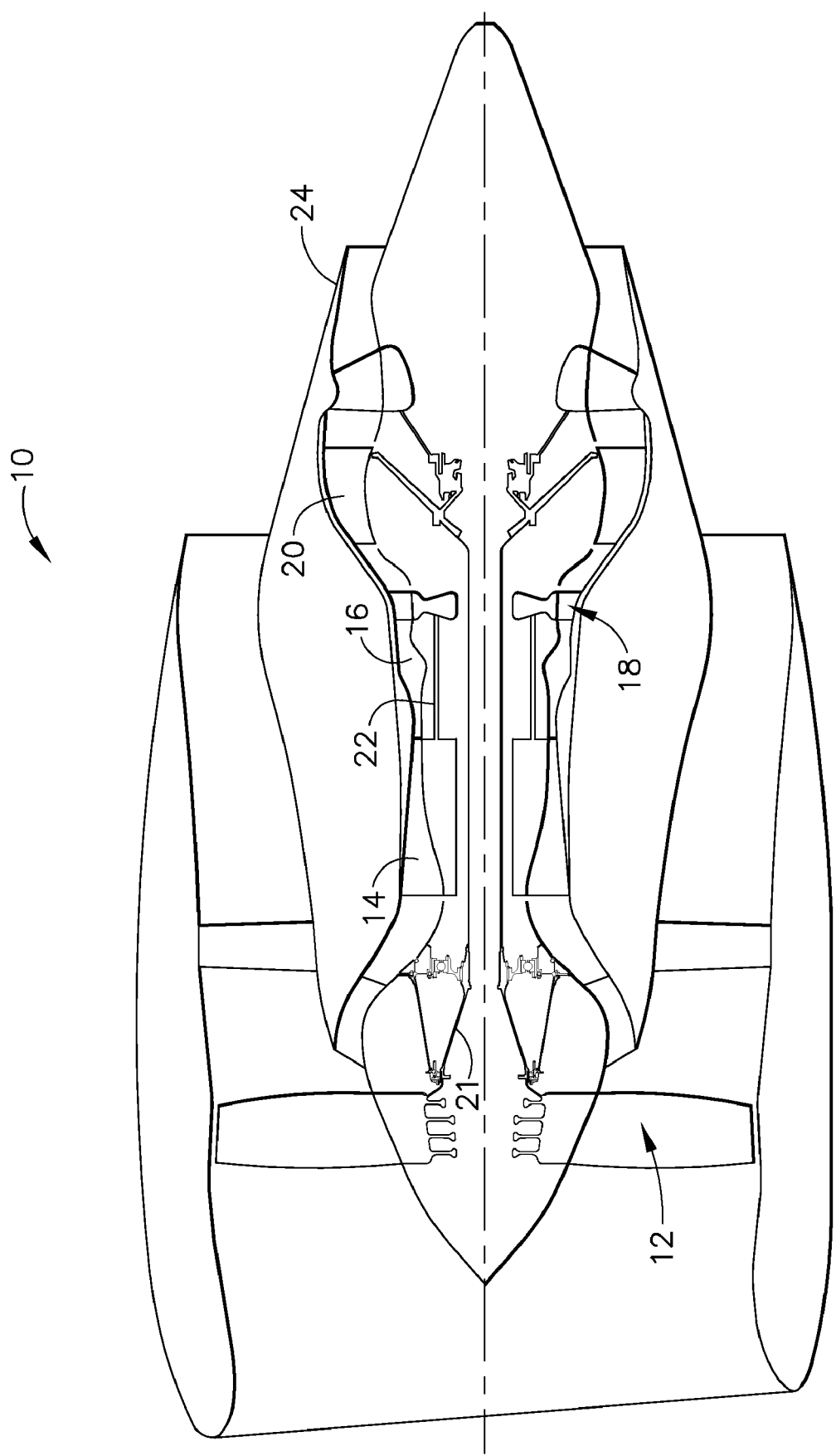
FIG. 1 is a schematic illustration of an exemplary gas turbine engine.

FIG. 1 is a schematic illustration of an exemplary gas turbine engine 10 including a fan assembly 12, a high-pressure compressor 14, and a combustor 16. Engine 10 also includes a high-pressure turbine 18 and a low-pressure turbine 20. Fan assembly 12 and low-pressure turbine 20 are coupled by a first shaft 21, and compressor 14 and high-pressure turbine 18 are coupled by a second shaft 22. In one embodiment, gas turbine engine 10 is a GE90 engine commercially available from General Electric Aircraft Engines, Cincinnati, Ohio.

During operation, air flows through fan assembly 12 supplying compressed air to high-pressure compressor 14. The highly compressed air is delivered to combustor 16. Airflow from combustor 16 is channeled through one or more turbine nozzle assemblies (not shown in FIG. 1) to drive turbines 18 and 20, prior to exiting gas turbine engine 10 through an exhaust nozzle 24. More specifically, pressurized air from high-pressure compressor 14 is mixed with fuel in combustor 16 and ignited, thereby generating combustion gases. The combustion gases induce rotation of high-pressure turbine 18 which causes rotation of high-pressure compressor 14. The combustion gases are discharged from high-pressure turbine 18 into low-pressure turbine 20. The core airflow is discharged from low-pressure turbine 20 and directed aftward towards exhaust nozzle 24.

Figure 2:
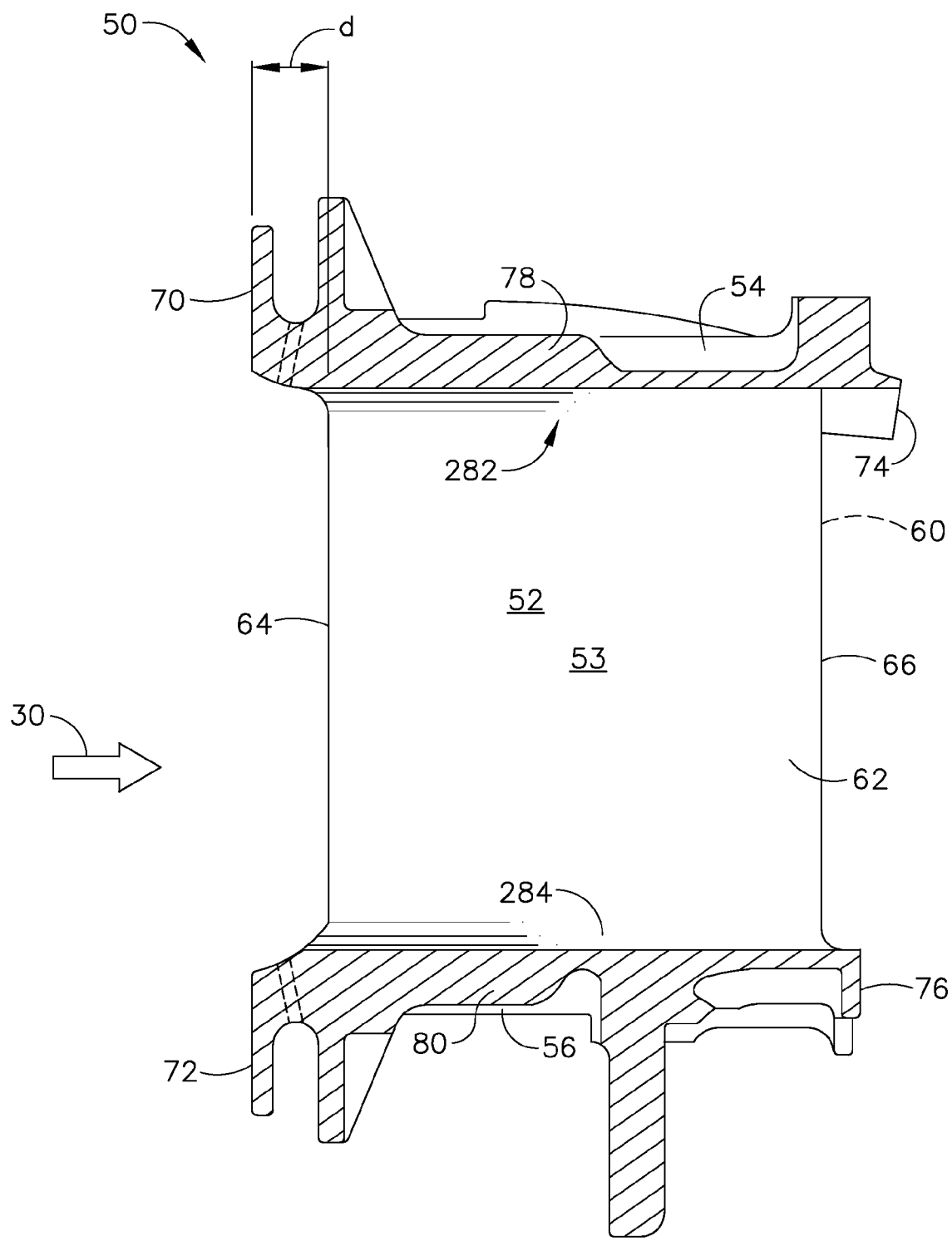
FIG. 2 is a side view of an exemplary known turbine nozzle assembly that may be used in the gas turbine engine shown in FIG. 1.

FIG. 2 is a side view of an exemplary turbine nozzle assembly 50 that may be used with a turbine engine, such as but not limited to gas turbine engine 10 (shown in FIG. 1). Although the present invention is described with reference to turbine nozzle assembly 50, those having ordinary skill in the art will appreciate that the present invention is not limited to use with turbine nozzle assembly 50 but may be used with other assemblies, such as a stator assembly. Nozzle assembly 50 includes a stator vane 52 that includes an airfoil 53 formed by a pressure-side sidewall 60 and a suction-side sidewall 62 that are joined together at a leading edge 64 and at a chordwise-spaced trailing edge 66 such that a cooling cavity (not shown in FIG. 2) is defined between sidewalls 60 and 62. Airfoil sidewalls 60 and 62 each extend radially between an outer band 54 and an inner band 56. In the exemplary embodiment, sidewall 60 is concave, and sidewall 62 is convex such that stator vane 52 has a cambered profile. Furthermore, airfoil 53 includes a tip portion 282 and a root portion 284.

Outer band 54 includes a leading edge surface 70, a trailing edge surface 74, and a body 78 extending therebetween. Inner band 56 includes a leading edge surface 72, a trailing edge surface 76, and a body 80 extending therebetween. In the exemplary embodiment, stator vane 52 is oriented such that outer and inner band leading edge surfaces 70 and 72, respectively, are each a distance d upstream from stator vane leading edge 64.

Figure 3:
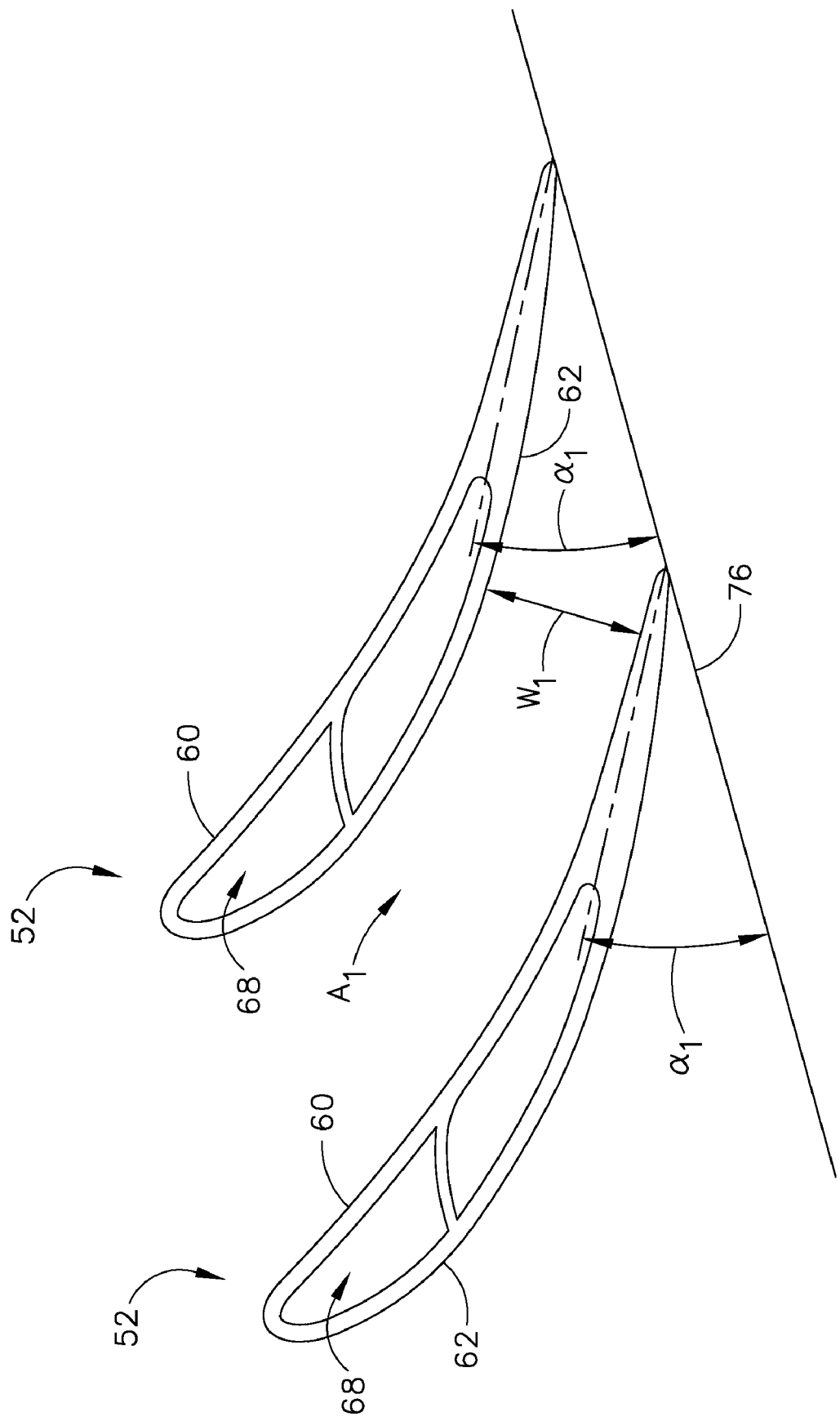
FIG. 3 is a cross-sectional view of two known stator vanes that may be used with the nozzle assembly shown in FIG. 2.

FIG. 3 is a bottom cross-sectional view of a pair of adjacent stator vanes 52 that may be used with turbine nozzle assembly 50. Stator vanes 52 are each oriented at an angle $\alpha_1$ with respect to trailing edge surface 76 on inner band 56 such that a throat area $A_1$ is defined between vanes 52. By adjusting angle $\alpha_1$, a width $W_1$ of throat area $A_1$ can be increased or decreased. More specifically, increasing throat area $A_1$ facilitates increasing a mass flow of air channeled between stator vanes 52, and decreasing throat area $A_1$ facilitates decreasing the mass flow of air channeled between stator vanes 52.

Figure 4:
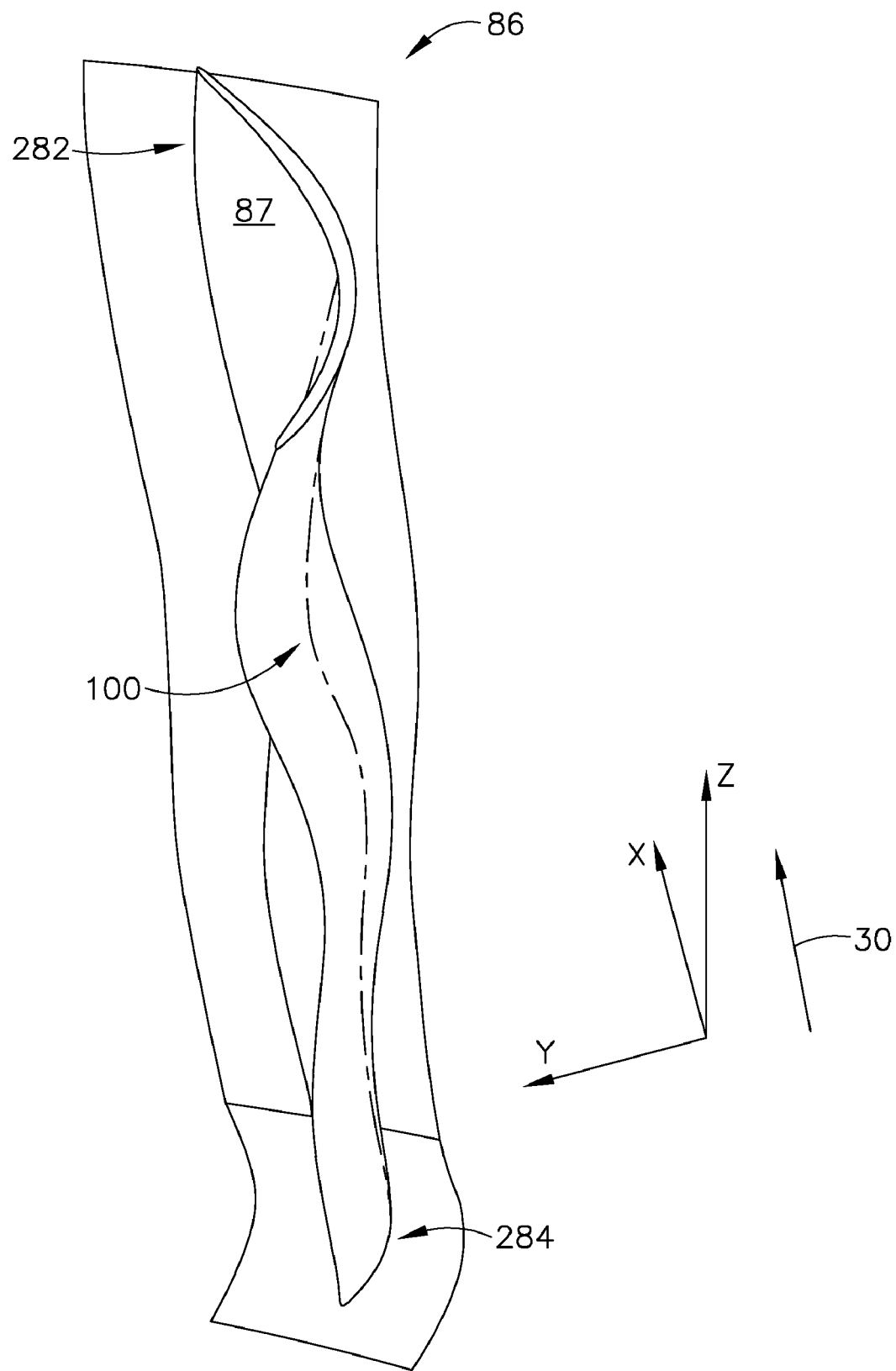
FIG. 4 illustrates an exemplary multi-lean vane that may be used in the gas turbine engine shown in FIG. 1.
Figure 5:
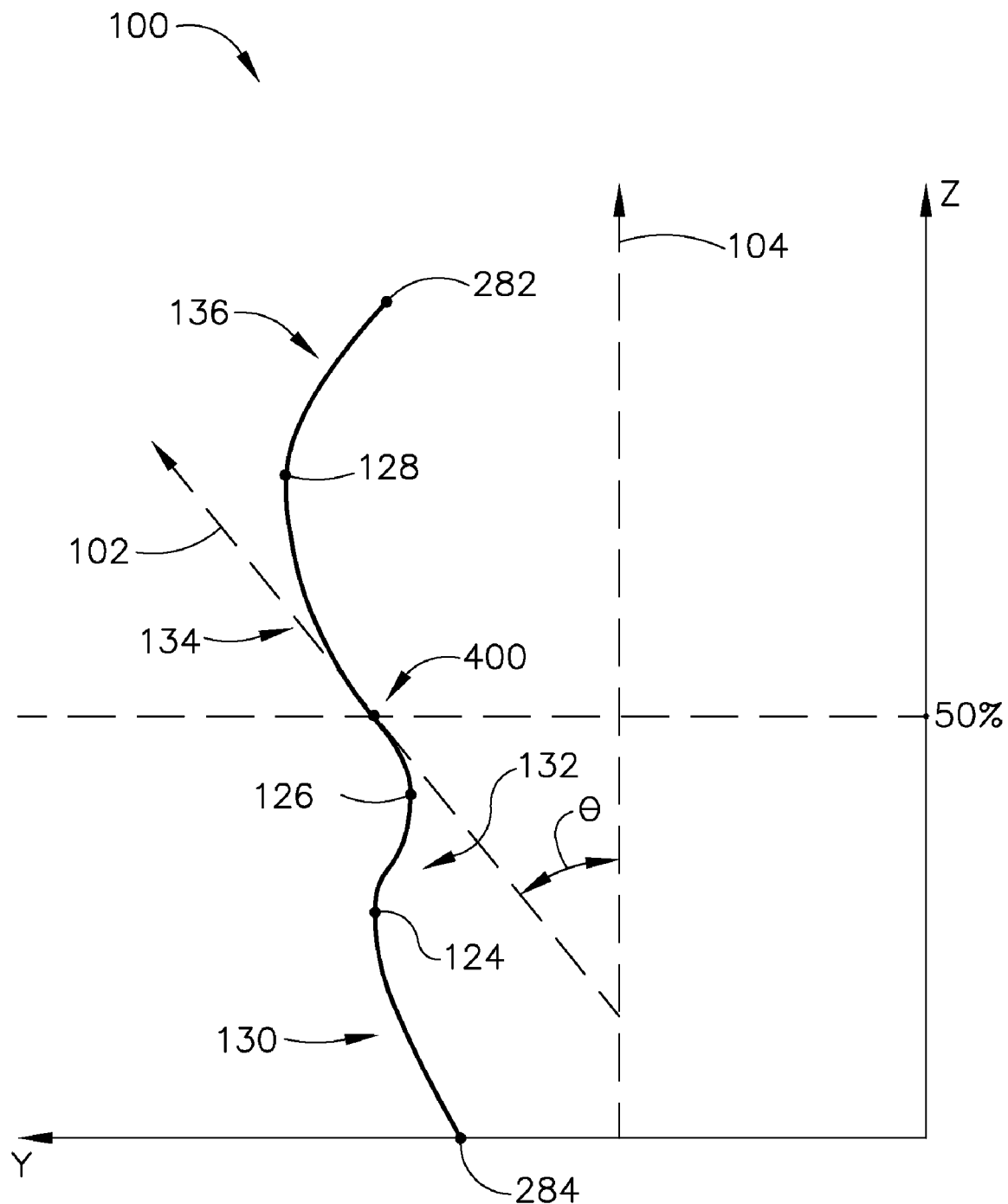
FIG. 5 illustrates a centerline cross-section of the multi-lean vane shown in FIG. 4.

FIGS. 4 and 5 illustrate an exemplary multi-lean vane 86 that may be used with turbine nozzle assembly 50. More specifically, FIG. 4 is a perspective view of one embodiment of multi-lean vane 86 that includes an axial axis (X-axis), a tangential or circumferential axis (Y-axis), and a radial axis (Z-axis). Multi-lean vane 86 is similar to exemplary stator vane 52 and includes an airfoil 87 and a centerline 100. Centerline 100 extends generally radially from root portion 284 to tip portion 282 along the surface of sidewall 62. FIG. 5 illustrates a cross-sectional view of vane 86 taken through centerline 100 and along the Y-Z plane. In the exemplary embodiment, the X-axis extends generally downstream relative to flowpath 30, the Z-axis extends generally radially outwardly from inner band 56 (shown in FIG. 2), and the Y-axis extends generally in the circumferential direction.

As used herein, the term "lean" is defined as a radial angle $\Theta_L$ defined between a surface tangent 102 of multi-lean vane 86 in the Y-Z plane and a line 104 extending substantially parallel to the Z-axis. In some embodiments, the amount of lean of vane 86 is referred to as "tilt." If a portion of vane 86 has a negative radial angle $\Theta_L$ with respect to line 104, as shown in FIG. 5, then that portion of vane 86 has a forward lean. If a portion of vane 86 has a positive radial angle $\Theta_L$ with respect to line 104, then that portion of vane 86 has a backward lean. Described in more detail below, airfoil 87 includes a plurality of lean portions. As used herein, the term "lean portion" refers to a radially-extending portion of vane 86 that is defined between a pair of radially adjacent lean directional changes, or between a lean directional change and tip portion 282, or between a lean directional change and root portion 284. As used herein, the term "lean directional change" refers to a point defined on airfoil 87 in which the direction of lean changes from a forward lean to a backward lean, or vice-versa.

Figure 6:
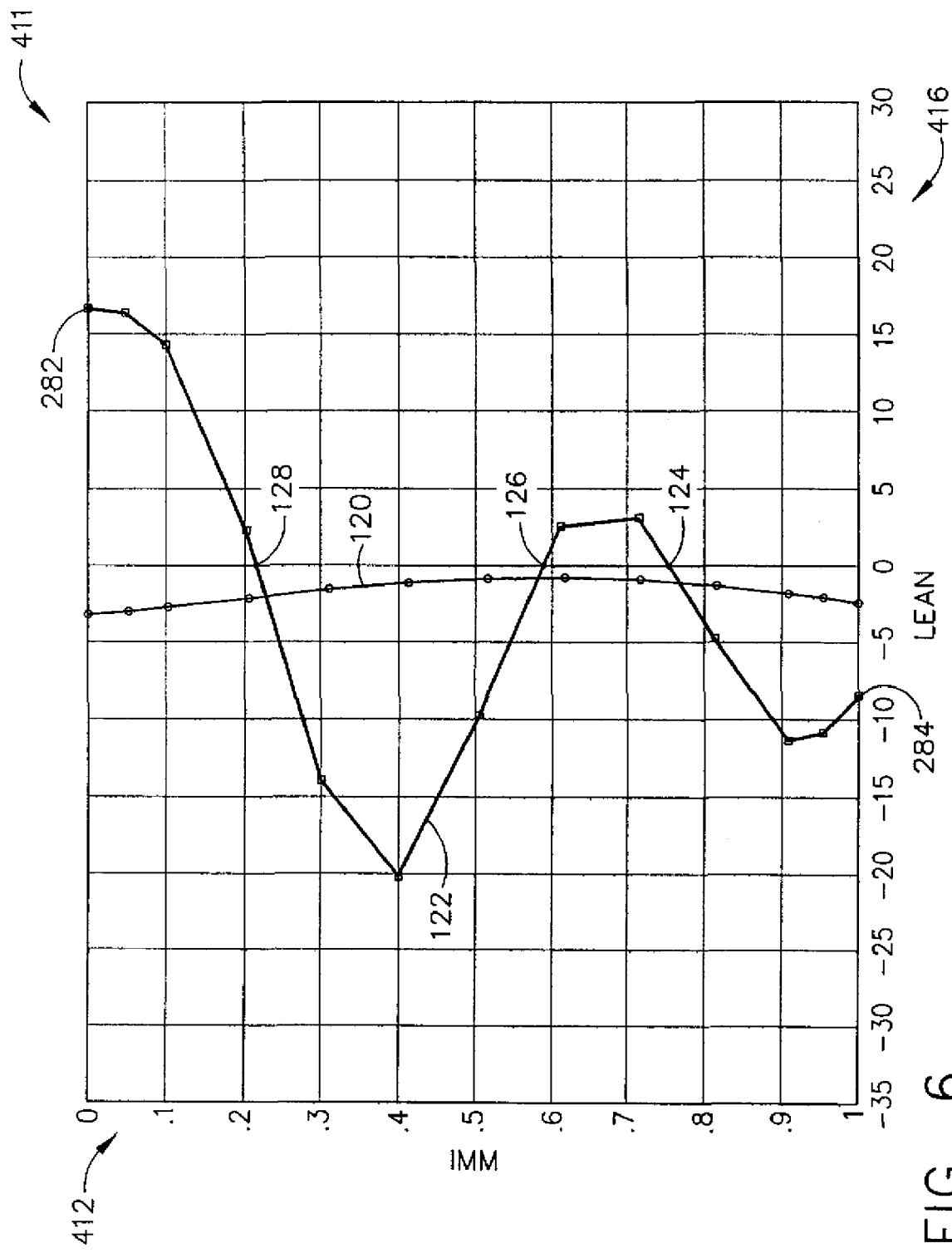
FIG. 6 is a graph illustrating exemplary lean angle values of the multi-lean vane shown in FIG. 4.

FIG. 6 is a graph 411 illustrating exemplary lean angle values 122 associated with leading edge 64 of multi-lean vane 86.

More specifically, the lean angle values 122 associated with edge 64 are plotted graphically wherein the ordinate 413 of graph 411 represents a percent of span of airfoil 87, and the abscissa 416 of graph 411 represents an amount of lean angle $\Theta_L$, as measured in degrees, of edge 64. For illustrative purposes, a solid line 120 represents an amount of lean associated with a conventional stator vane. Accordingly, at root portion 284, represented at an immersion point of 1.0, the lean angle value 122 of edge 64 is approximately equal to −8°. Airfoil 87 leans forward from root portion 284 to an immersion point of approximately 0.75, wherein the lean changes from a negative lean angle to a positive lean angle at a lean directional change 124. Airfoil 87 leans backwards from directional change 124 to an immersion point of approximately 0.58, wherein a lean directional change 126 is defined. Airfoil 87 leans forward from directional change 126 to an immersion point of approximately 0.22, wherein a lean directional change 128 is defined. Accordingly, in the exemplary embodiment, vane 86 includes three lean directional changes, 124, 126, and 128 defined on edge 64. Alternatively, vane 86 may include any number of lean directional changes defined on edge 64.

In the exemplary embodiment, vane 86 includes four lean portions 130, 132, 134, and 136 defined along edge 64 (shown in FIG. 5). A first lean portion 130 is defined between root portion 284 and directional change 124 on airfoil 87, a second lean portion 132 is defined between directional change 124 and directional change 126, a third lean portion 134 is defined between directional change 126 and directional change 128, and a fourth lean portion 136 is defined between directional change 128 and tip portion 282. Accordingly, in the exemplary embodiment, vane 86 includes two lean portions 130 and 132 that are defined between root portion 284 and a midpoint 400 of airfoil 87. Third lean portion 134 begins between root portion 284 and midpoint 400 and extends nearly 40% of airfoil 87. As such, vane 86 has a reverse S-shape between root portion 284 and midpoint 400 and a C-shape between tip portion 282 and midpoint 400. Alternatively, vane 86 may include any number of lean portions and may have a variety of shapes.

In the exemplary embodiment, vane 86 as described above with lean portions 130, 132, 134, and 136 is in a first stage of a low-pressure turbine, such as low-pressure turbine 20.

Figure 7:
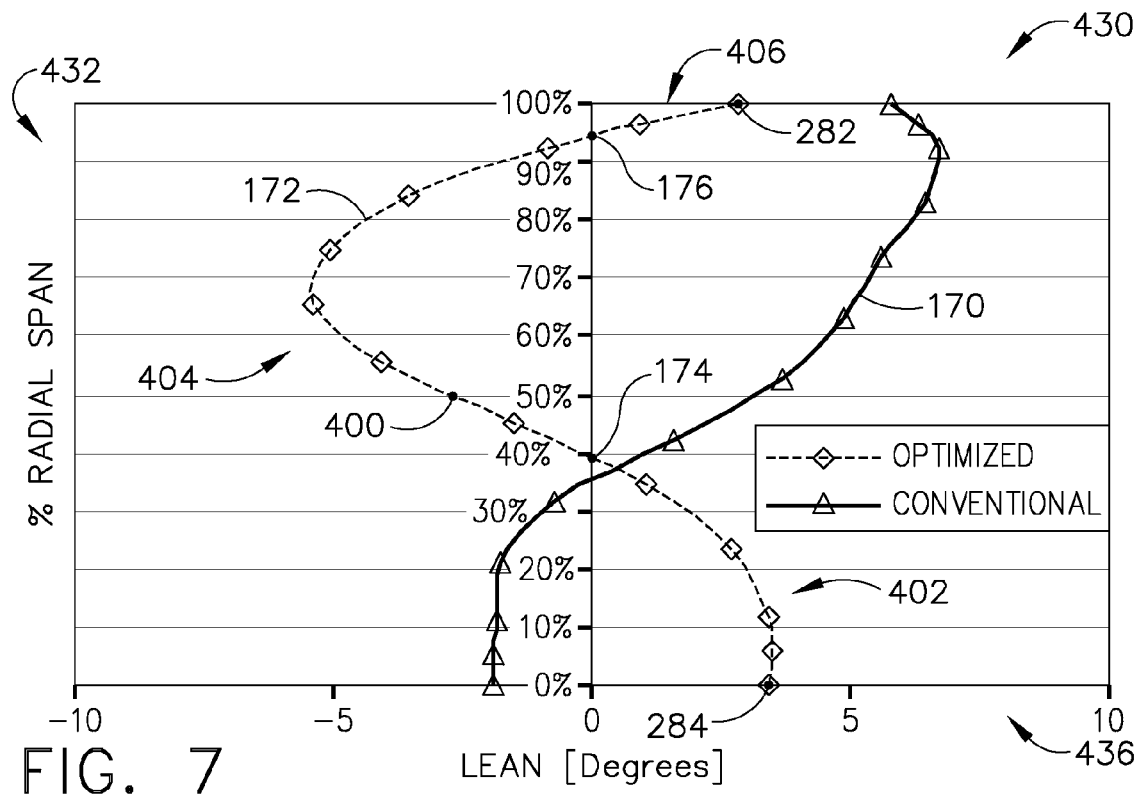
FIG. 7 is a graph illustrating exemplary lean angle values for a leading edge of the multi-curve vane shown in FIG. 4.

FIG. 7 is a graph 430 illustrating lean angle values 172 associated with leading edge 64 for another embodiment of vane 86. More specifically, the lean angle values 172 of leading edge 64 are plotted graphically wherein the ordinate 432 of graph 430 represents a percent of span of airfoil 87, and the abscissa 436 of graph 430 represents an amount of lean angle $\Theta_L$, in degrees, of leading edge 64. For illustrative purposes, a solid line 170 represents an amount of lean associated with a conventional stator vane. Accordingly, at root portion 284, represented at a radial span of 0%, the lean angle value 172 of leading edge 64 is approximately equal to 4°. Airfoil 87 leans backwards from root portion 284 to a radial span of approximately 40%, wherein the lean changes from a positive lean angle to a negative lean angle at a lean directional change 174. Airfoil 87 leans forward from directional change 174 to a radial span of approximately 95%, wherein a lean directional change 176 is defined. Airfoil 87 leans backwards from directional change 176 to tip portion 282.

Accordingly, in the exemplary embodiment, multi-curve vane 96 includes two lean directional changes 174 and 176 defined on leading edge 64. Alternatively, vane 96 includes any number of directional changes defined on leading edge 64.

In the exemplary embodiment, leading edge 64 of multi-curve vane 96 includes three lean portions 402, 404, and 406. A first lean portion 402 is defined between root portion 284 and directional change 174 on airfoil 87, a second lean portion 404 is defined between directional change 174 and directional change 176, a third lean portion 406 is defined between directional change 176 and tip portion 282. Accordingly, in the exemplary embodiment, leading edge 64 includes one lean portion 402 defined between root portion 284 and midpoint 400 and extends across approximately 40% of airfoil 87. Second lean portion 404 begins between root portion 284 and midpoint 400 and extends across approximately 45% of airfoil 87. As such, in the exemplary embodiment, leading edge 64 has a S-shape. Alternatively, leading edge 64 may include any number of lean portions and may have a variety of shapes.

Figure 8:
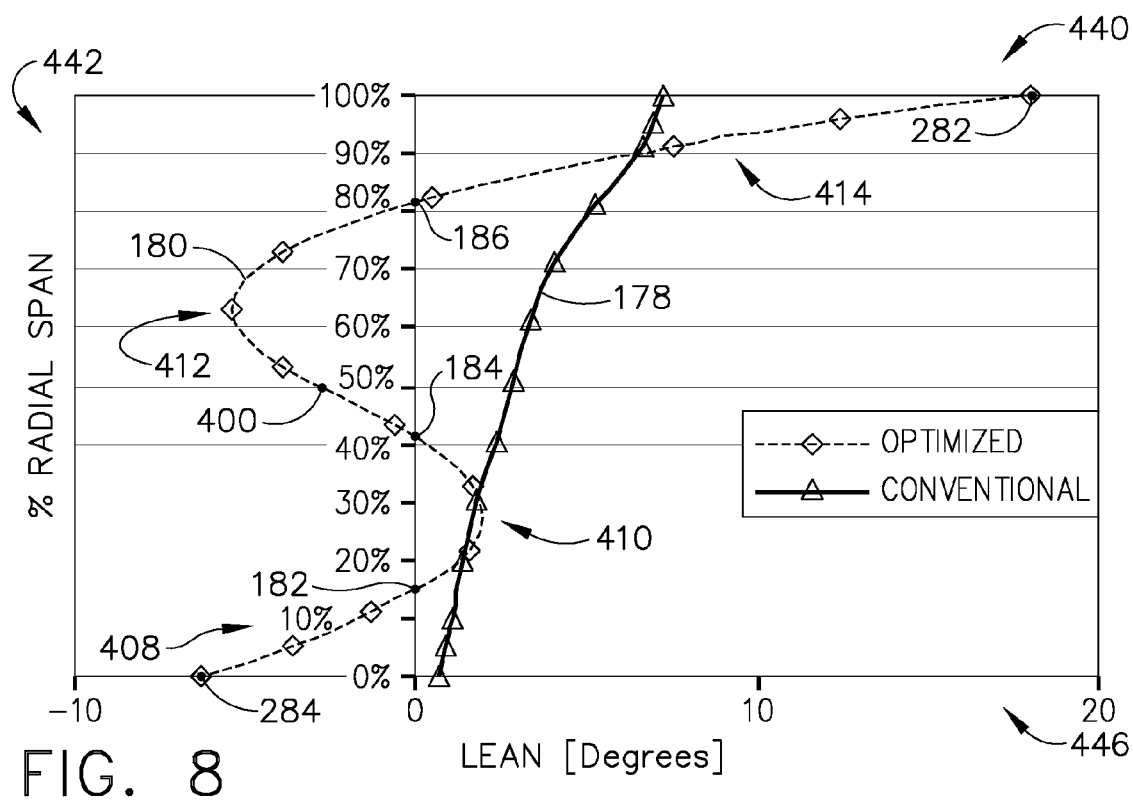
FIG. 8 is a graph illustrating exemplary lean angle values for a trailing edge of the multi-curve vane shown in FIG. 4.

FIG. 8 is a graph 440 illustrating exemplary lean angle values 180 associated with trailing edge 66 of multi-curve vane 86. More specifically, the lean angle values 180 of trailing edge 66 are plotted graphically wherein the ordinate 442 of graph 440 represents a percent of span of airfoil 87, and the abscissa 446 of graph 440 represents an amount of lean angle $\Theta_L$, in degrees, of trailing edge 66. For illustrative purposes, a solid line 178 represents an amount of lean associated with a conventional stator vane. Accordingly, at root portion 284, represented at a radial span of 0%, lean angle value 180 of trailing edge 66 is approximately equal to −6°. Airfoil 87 leans forward from root portion 284 to a radial span of approximately 15%, wherein the lean changes from a negative lean angle to a positive lean angle at a lean directional change 182. Airfoil 87 leans backwards from directional change 182 to a radial span of approximately 40%, wherein a lean directional change 184 is defined. Airfoil 87 leans forward from directional change 184 to a radial span of approximately 80%, wherein a lean directional change 186 is defined.

Accordingly, in the exemplary embodiment, multi-curve vane 96 includes three lean directional changes 182, 184, and 186 defined on trailing edge 66. Alternatively, vane 96 may include any number of lean directional changes.

In the exemplary embodiment, multi-curve vane 96 includes four lean portions 408, 410, 412, and 414 defined along trailing edge 66. A first lean portion 408 is defined between root portion 284 and directional change 182 on airfoil 87, a second lean portion 410 is defined between directional change 182 and directional change 184, a third lean portion 412 is defined between directional change 184 and directional change 186, and a fourth lean portion 414 is defined between directional change 186 and tip portion 282. Accordingly, in the exemplary embodiment, vane 96 includes two lean portions 408 and 410 that are defined between root portion 284 and midpoint 400. Third lean portion 412 begins between root portion 284 and midpoint 400 and extends across approximately 45% of trailing edge 66. As such, trailing edge 66 has a S-shape. Alternatively, vane 96 may include any number of lean portions and may have a variety of shapes.

Figure 9:
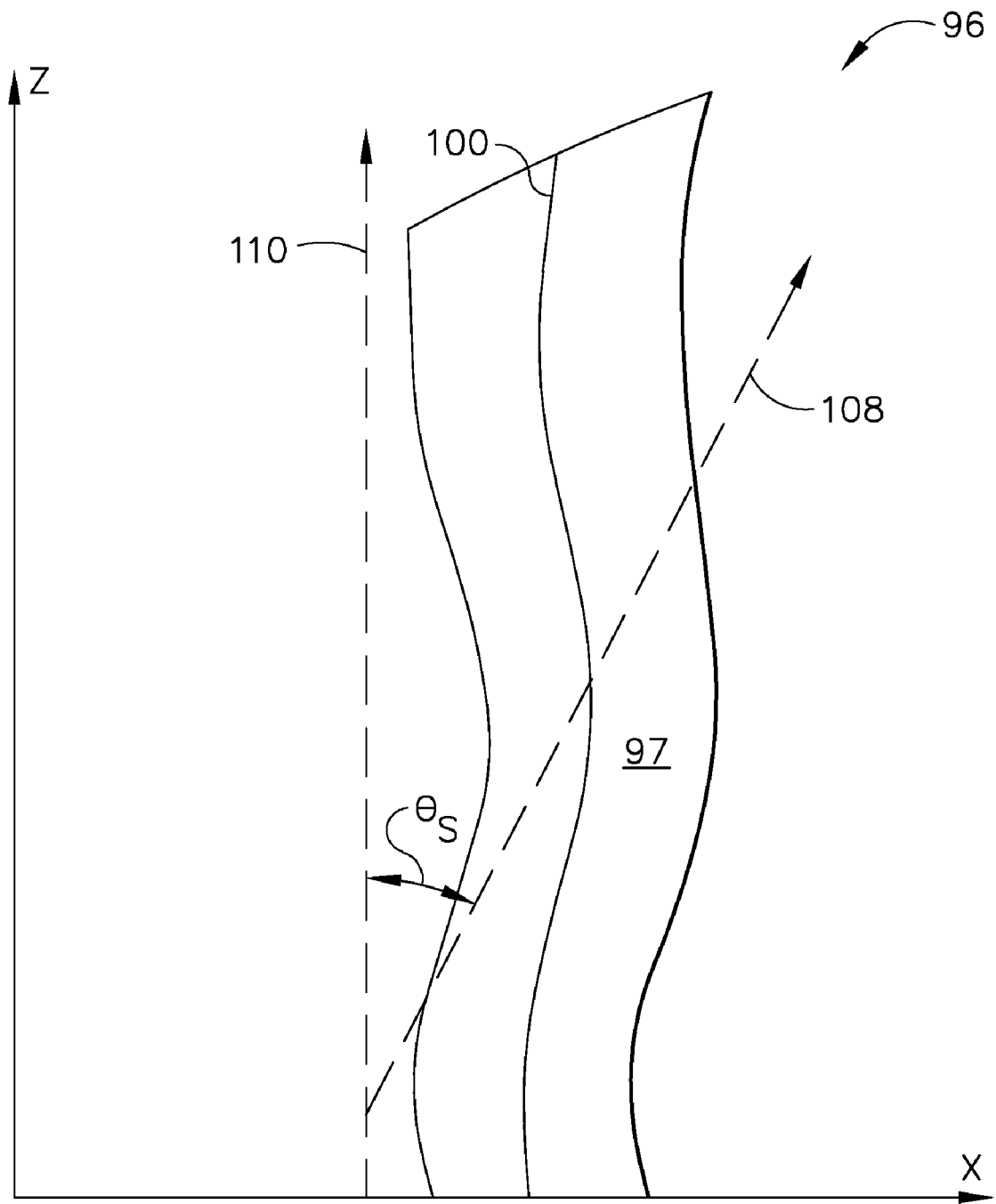
FIG. 9 is a side-perspective illustrating an exemplary sweep angle of the multi-curve vane shown in FIG. 4.

FIG. 9 illustrates an exemplary sweep angle as oriented on multi-curve vane 86. As used herein, the term "sweep" is defined as a radial angle $\Theta_S$ defined between a surface tangent 108 to vane 96 in the X-Z plane and a nominal line 110 extending substantially parallel to the Z-axis. If a portion of vane 96 has a negative radial angle $\Theta_S$ with respect to line 110, then that portion of vane 96 has a backward sweep. If a portion of vane 96 has a positive radial angle $\Theta_S$ with respect to line 110, then that portion of vane 96 has a forward sweep. As described in more detail below, airfoil 87 includes a plurality of sweep portions. As used herein, the term "sweep portion" refers to a radially-extending portion of vane 96 that is defined between a pair of radially adjacent sweep directional changes, or between a sweep directional change and tip portion 282, or between a sweep directional change and root portion 284. As used herein, the term "sweep directional change" refers to a point of airfoil 87 in which the direction of sweep changes from a forward sweep to a backward sweep, or vice-versa.

Figure 10:
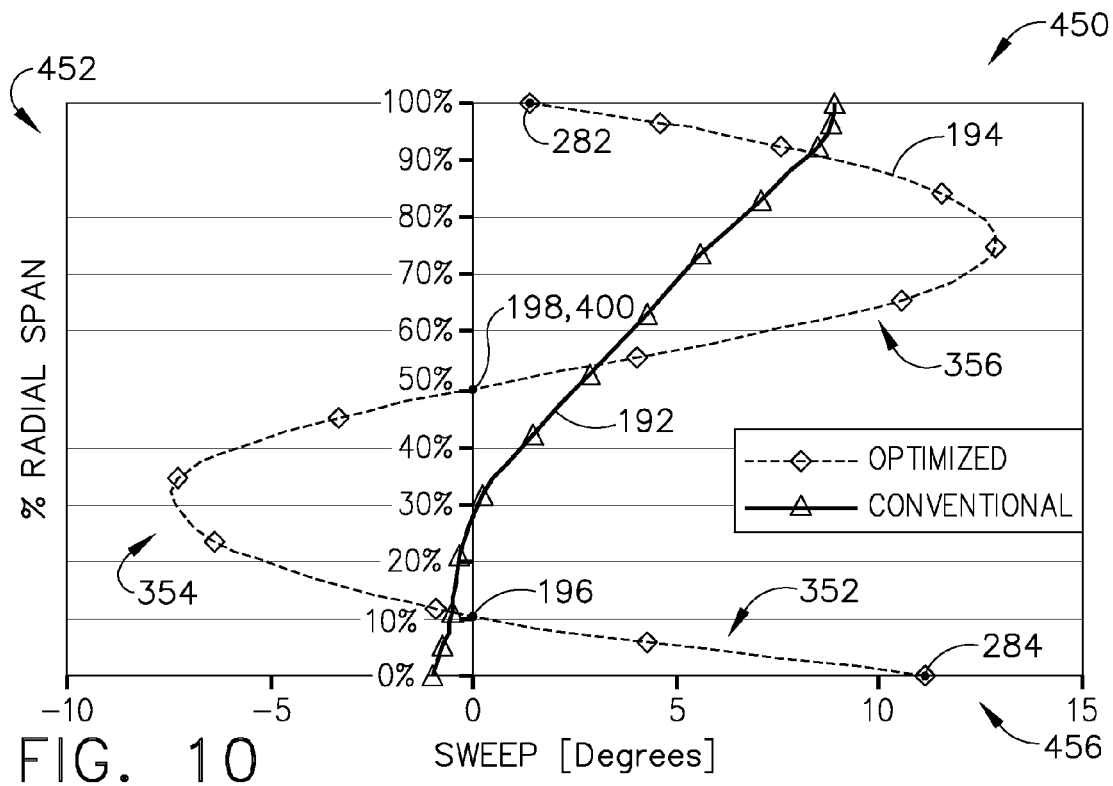
FIG. 10 is a graph illustrating exemplary sweep angle values for the leading edge of the multi-curve vane shown in FIG. 4.

FIG. 10 is a graph 450 illustrating exemplary sweep angle values 194 associated with leading edge 64 of multi-curve vane 96. More specifically, the sweep angle values 194 associated with leading edge 64 are plotted graphically wherein the ordinate 452 of graph 450 represents a percent of span of airfoil 87, and the abscissa 456 of graph 450 represents an amount of sweep angle $\Theta_S$, in degrees, of leading edge 64. For illustrative purposes, a solid line 192 represents an amount of sweep associated with a conventional stator vane. Accordingly, at root portion 284, represented at a radial span of 0%, the sweep angle value 192 of leading edge 64 is approximately equal to 12°. Airfoil 87 sweeps forward from root portion 284 to a radial span of approximately 10%, wherein the sweep changes from a positive sweep angle to a negative sweep angle at a sweep directional change 196. Airfoil 87 sweeps backwards from directional change 196 to a radial span of approximately 50%, wherein a sweep directional change 198 is defined. Airfoil 87 sweeps forward from directional change 198 to tip portion 282. Accordingly, in the exemplary embodiment, multi-curve vane 96 includes two sweep directional changes 196 and 198 along leading edge 64. Alternatively, vane 96 may include any number of sweep directional changes.

In the exemplary embodiment, multi-curve vane 96 includes three sweep portions 352, 354, and 356 defined along leading edge 64. A first sweep portion 352 is defined between root portion 284 and directional change 196 on airfoil 87, a second sweep portion 354 is defined between directional change 196 and directional change 198, a third sweep portion 356 is defined between directional change 198 and tip portion 282. Accordingly, in the exemplary embodiment, vane 96 has two sweep portions 352 and 354 that are defined between root portion 284 and midpoint 400. Third sweep portion 356 begins at approximately midpoint 400 and extends across approximately 50% of airfoil 87 to tip portion 282. In alternative embodiments, vane 96 includes any number of sweep portions.

Figure 11:
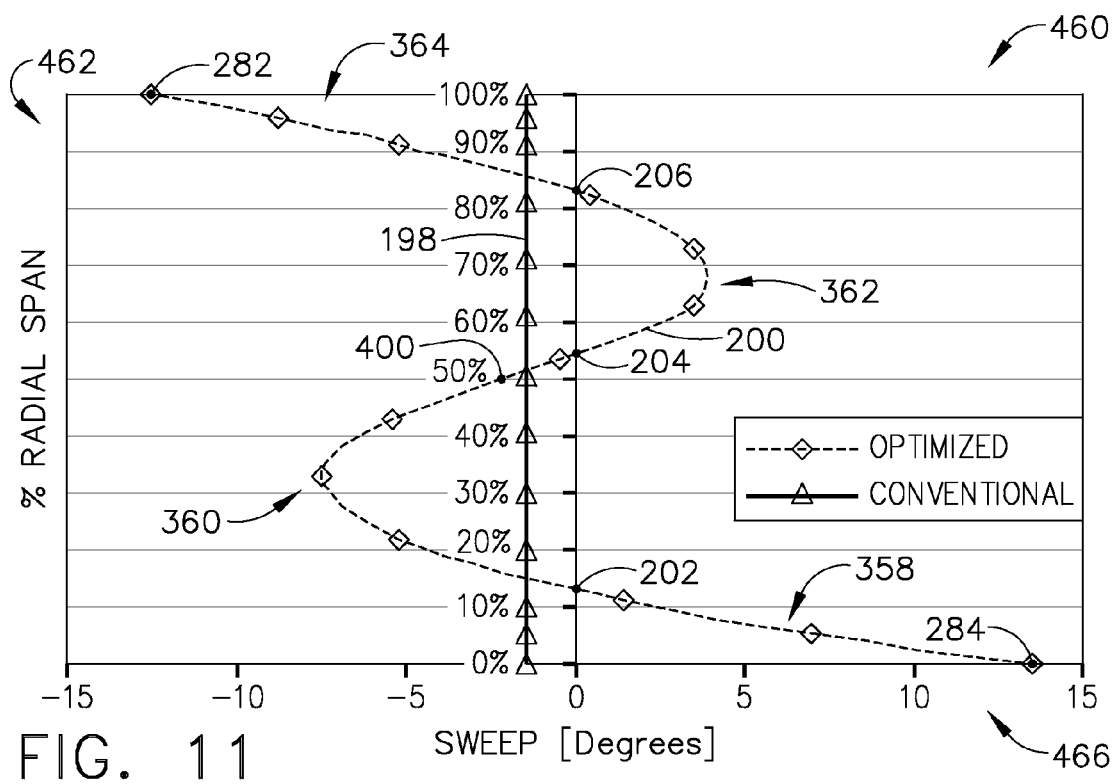
FIG. 11 is a graph illustrating exemplary sweep angle values for the trailing edge of the multi-curve vane shown in FIG. 4.

FIG. 11 is a graph 460 illustrating exemplary sweep angle values 200 associated with trailing edge 66 of multi-curve vane 86. More specifically, the sweep angle values 200 associated with trailing edge 66 are plotted graphically wherein the ordinate 462 of graph 460 represents a percent of span of airfoil 87, and the abscissa 466 of graph 460 represents an amount of sweep angle $\Theta_S$, in degrees, for trailing edge 66. For illustrative purposes, a solid line 199 represents an amount of sweep associated with a conventional stator vane. Accordingly, at root portion 284, represented at a radial span of 0%, sweep angle value 200 of trailing edge 66 is approximately equal to 14°. Airfoil 87 sweeps forward from root portion 284 to a radial span of approximately 14%, wherein the sweep changes from a positive sweep angle to a negative sweep angle at a sweep directional change 202. Airfoil 87 sweeps backwards from directional change 202 to a radial span of approximately 55%, wherein a sweep directional change 204 is defined. Airfoil 87 sweeps forward from directional change 204 to a radial span of approximately 84%, wherein a sweep directional change 206 is defined. Airfoil 87 sweeps backwards from directional change 206 to tip portion 282.

Accordingly, in the exemplary embodiment, multi-curve vane 96 includes three sweep directional changes 202, 204, and 206 defined along trailing edge 66. Alternatively, vane 96 may include any number of sweep directional changes along trailing edge 66.

In the exemplary embodiment, multi-curve vane 96 includes four sweep portions 358, 360, 362, and 364 defined on trailing edge 66. A first sweep portion 358 is defined between root portion 284 and directional change 202 on airfoil 87, a second sweep portion 360 is defined between directional change 202 and directional change 204, a third sweep portion 362 is defined between directional change 204 and directional change 206, and a fourth sweep portion 364 is defined between directional change 206 and tip portion 282. Accordingly, in the exemplary embodiment, vane 96 includes two sweep portions 362 and 364 defined between midpoint 400 and tip portion 282. Alternatively, vane 96 may include any number of sweep portions on trailing edge 66.

Figure 12:
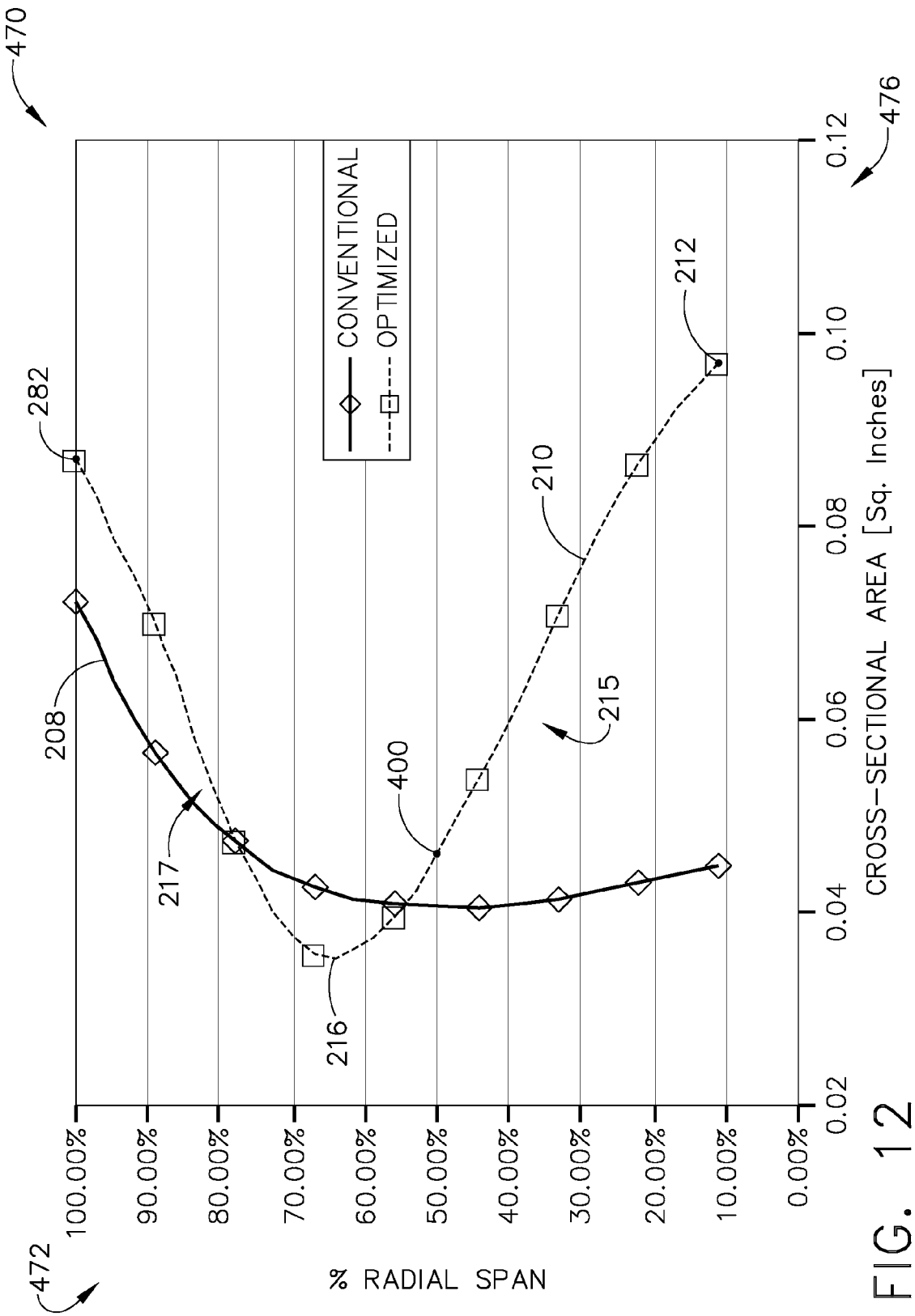
FIG. 12 is a graph illustrating exemplary cross-sectional area values of the multi-curve vane shown in FIG. 4.

FIG. 12 is a graph 470 illustrating exemplary cross-sectional areas of vane 86. In the exemplary embodiment, a profile of vane 96 varies from root portion 284 to tip portion 282 such that the cross-sectional area of vane 96 varies from root portion 284 to tip portion 282. More specifically, in FIG. 12 the exemplary values of cross-sectional areas 210 are plotted graphically wherein the ordinate 472 of graph 470 represents a percent of span of airfoil 87, and the abscissa 476 of graph 470 represents the cross-sectional area, in square inches, for airfoil 87 at the specific span location. For illustrative purposes, a solid line 208 represents an amount of cross-sectional area associated with a conventional stator vane. Accordingly, at a radial span location 212 near root portion 284, represented at a radial span of 10%, the cross-sectional area value of airfoil 87 is approximately equal to 0.097 sq. inches. Airfoil 87 converges from that span location 212 to its midpoint 400, wherein the cross-sectional area value is approximately equal to 0.047 sq. inches. Extending outwardly, the cross-sectional area of airfoil 87 continues to decrease until a span location 216 of approximately 65%, wherein the cross-sectional area is approximately equal to 0.035 sq. inches. Radially outward from span location 216, the cross-sectional area of airfoil 87 increases to tip portion 282, wherein the cross-sectional area is approximately equal to 0.085 sq. inches. Accordingly, in the exemplary embodiment, vane 96 includes a converging portion 215 (extending from span location 212 to span location 216), and a diverging portion 217 (extending from span location 216 to tip portion 282). Alternatively, vane 96 may include any number of converging and diverging portions 215, 217, respectively, that each extend between any pair of span locations.

In the exemplary embodiment, vane 96 as described above with respect to lean portions 402, 404, 406, 408, 410, 412, and 414 sweep portions 352, 354, 356, 358, 360, 362, and 364, and converging portion 215 and diverging portion 217 is in a second stage of a low-pressure turbine, such as low-pressure turbine 20.

The airfoil profiles of vanes 86, which include sweep portions 352, 354, 356, 358, 360, 362, and 364, lean portions 130, 132, 134, 136, 402, 404, 406 408, 410, 412, and 414, and the radially converging and diverging portions 215, 217, respectively, facilitate reducing secondary airflow characteristics and reducing an overall strength of the secondary airflow. Reduced secondary airflows result in a higher nozzle exit pressure and a higher turbine efficiency.

More specifically, the profile vane 96 facilitates reducing secondary airflows that result in circumferential pressure losses. By reducing secondary airflows, it has been shown that aerodynamic losses may be facilitated to be reduced and turbine efficiency (EFFA) may be improved.

In the exemplary embodiment, vane 96 includes a root portion 284 that is larger than the root portion of a conventional stator vane. Root portion 284 includes a leading edge portion and a pressure side portion. Root portion 284 facilitates weakening any horseshoe vortexes that may be created near root portion 284 and weakening the passage vortex that may be created along the inner band 56 between two vanes 86. More specifically, the leading edge portion facilitates weakening the pressure side leg of the horseshoe vortexes, which facilitates weakening the passage vortex between vanes 86. The pressure side portion, in addition to the added axial sweep of the leading edge portion, facilitates reducing a pressure gradient that may be generated between the pressure and the suction sides 60 and 62 of airfoil 87. This also facilitates reducing the passage vortex. Moreover, root portion 284 facilitates reducing circumferential pressure losses associated with vane 86.

Figure 13:
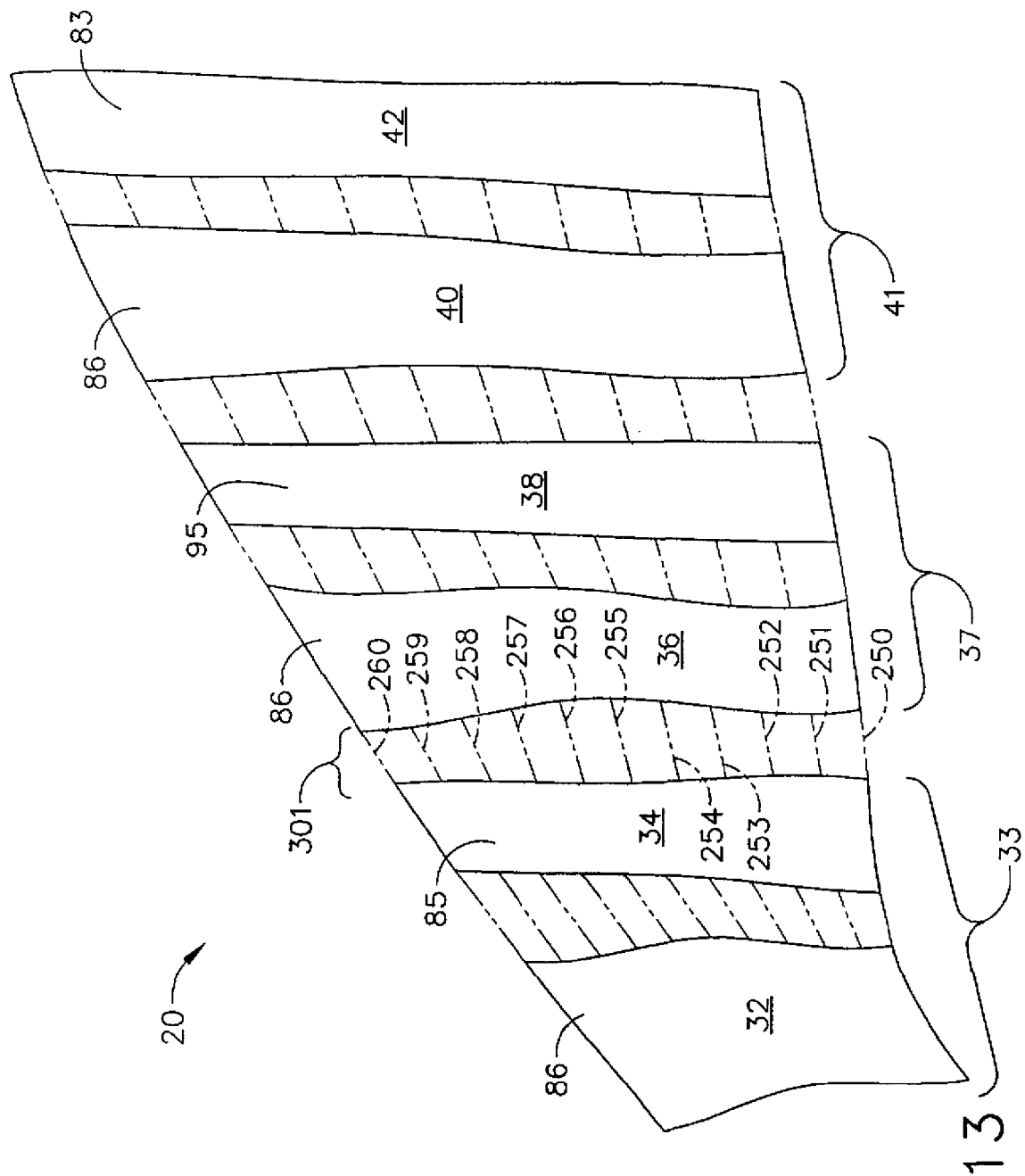
FIG. 13 is a side schematic view of a portion of an exemplary turbine assembly that may be used with the gas turbine engine shown in FIG. 1.

FIG. 13 is a side schematic view of a portion of an exemplary turbine assembly that may be used with gas turbine engine 10, such as low-pressure turbine assembly 20. In the exemplary embodiment, turbine assembly 20 includes a first stator assembly 32 coupled to engine 10 upstream from a first rotor blade assembly 34, a second stator assembly 36 coupled upstream from a second rotor blade assembly 38, and a third stator assembly 40 coupled upstream from a third rotor blade assembly 42. Stator assembly 32 and rotor blade assembly 34 form a first stage 33, stator assembly 36 and rotor blade assembly 38 form a second stage 37, and stator assembly 40 and rotor blade assembly 42 form a third stage 41. In the exemplary embodiment, first stator assembly 32 includes at least one vane 86 that includes a plurality of lean portions and at least one rotor blade 85, and second stator assembly 36 includes at least one vane 86 including a plurality of lean portions and sweep portions and at least one rotor blade 95. Alternatively, turbine assembly 20 may include any number of stator and rotor blade assemblies 32 and 36.

In the exemplary embodiment, each stator vane 86 is separated from a downstream rotor blade and/or an upstream rotor blade, such as rotor blades 85, 95, by an axial distance 301 when coupled within turbine assembly 20. The axial distance 301 varies radially between vane 86 and the respective blade, and is defined at a plurality of axial spacings. For example, in the exemplary embodiment, eleven axial spacings were measured between blade 85 and vane 86. A root axial spacing 250 is measured between the root of vane 86, i.e., radial span of 0%, to the root of an adjacent rotor blade 85. Specifically, an axial spacing is identified at locations 251-260. In the exemplary embodiment, axial spacings are identified at 10% increments measured from the roots of each vane 86 and the respective blade.

Figure 14:
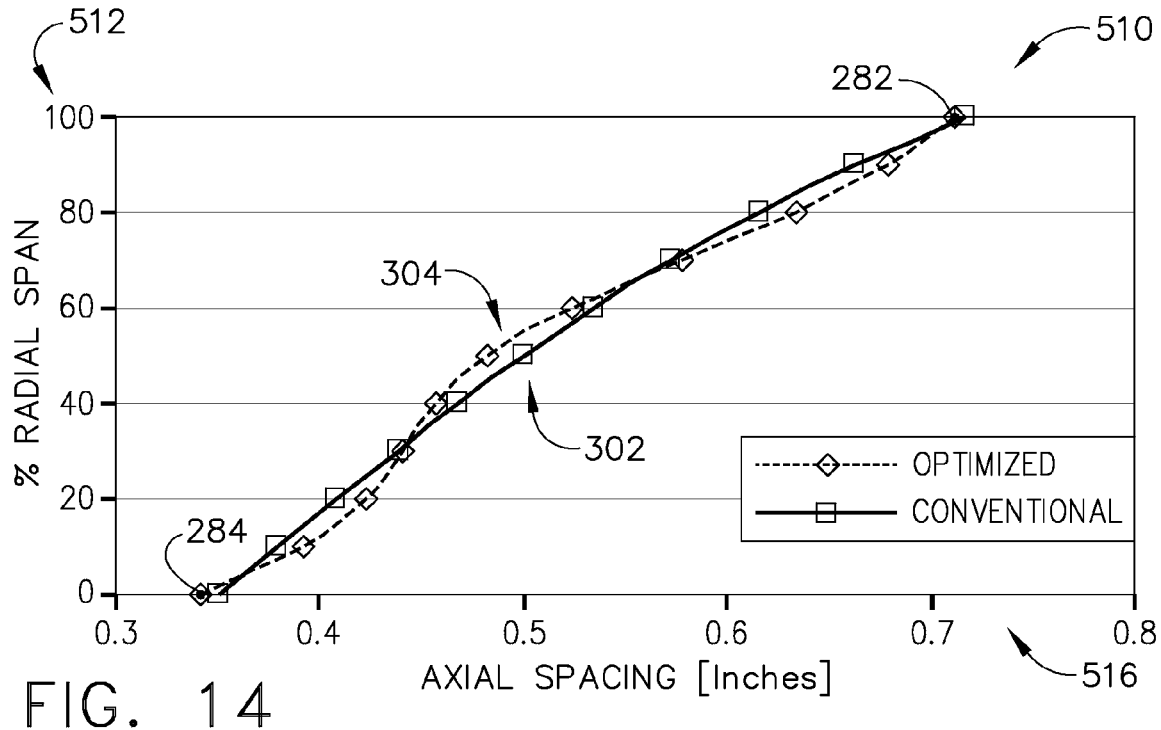
FIG. 14 is a graph illustrating exemplary axial spacing values defined within a first stage of the turbine assembly shown in FIG. 13.

FIG. 14 is a graph 510 illustrating exemplary axial spacing values measured between vane 86 and blade 85, which form first stage 33 of turbine assembly 20. More specifically, the axial spacing values 304 defined between vane 86 and blade 85 are plotted graphically wherein the ordinate 512 of graph 510 represents a percent of radial span of the vane and blade airfoils, and the abscissa 516 of graph 510 represents the axial spacing, in inches, at a specific radial span location. For illustrative purposes, a solid line 302 represents the axial spacing values associated with a conventional stator vane. Accordingly, at root portion 284, represented at a radial span of 0%, the axial spacing value 304 is approximately equal to 0.35 inches. As shown in graph 510, the axial spacing 304 within first stage 33 increases gradually from root portion 284 to the tip portions of the vane and blade airfoils.

Figure 15:
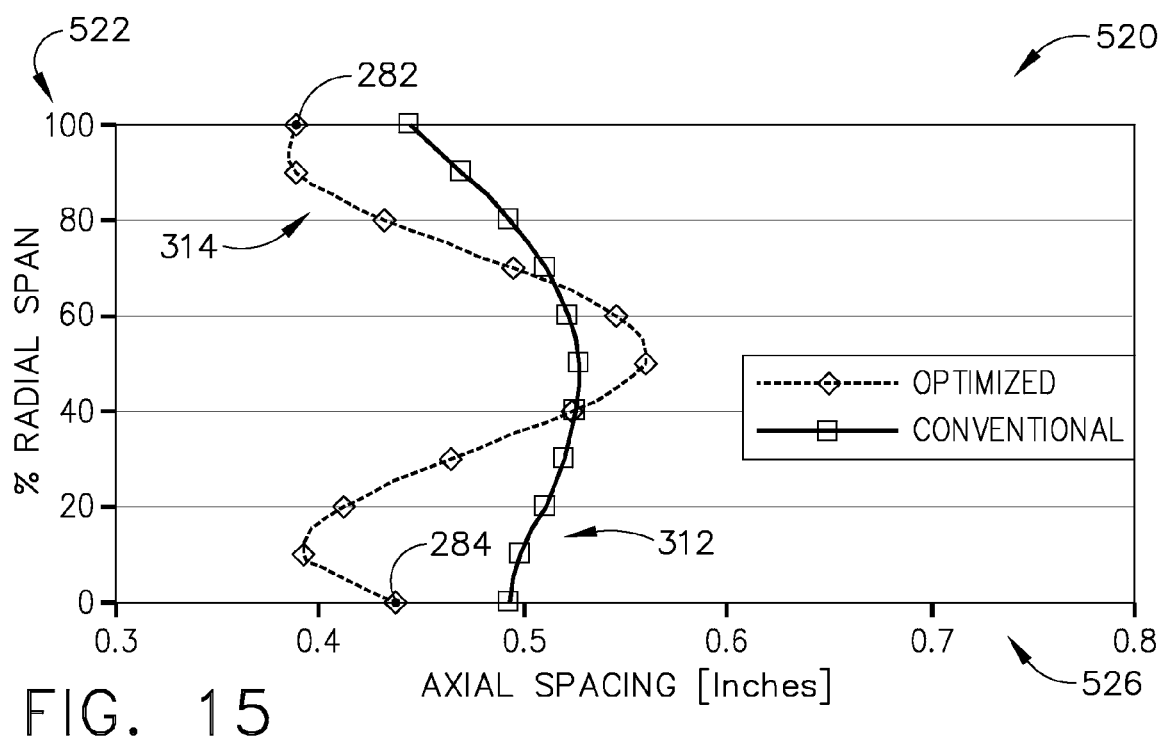
FIG. 15 is a graph illustrating exemplary axial spacing values defined between the first and second stages of the turbine assembly shown in FIG. 13.

FIG. 15 is a graph 520 illustrating exemplary axial spacing values between first stage 33 and second stage 37, i.e., between blade 85 and immediately downstream vane 86. More specifically, the axial spacing values 314 between blade 85 and vane 86 are plotted graphically wherein the ordinate 522 of graph 520 represents a percent of radial span of the vane and blade airfoils, and the abscissa 526 of graph 520 represents the axial spacing, in inches, at a specific radial span location. For illustrative purposes, a solid line 312 presents an amount of axial spacing associated with a conventional stator vane. Accordingly, at root portion 284, represented at a radial span of 0%, the axial spacing value 314 is approximately equal to 0.44 inches. The axial spacing 314 decreases from root portion 284 to a radial span of approximately 10%. The axial spacing 314 increases from the 10% span location to a radial span of approximately 50%, wherein the axial spacing again decreases from the midpoint to the tips of the blade and vane. Accordingly, in the exemplary embodiment, the axial spacing 314 between blade 85 and immediately downstream vane 86 has two axial spacing changes defined at the 10% span and the 50% span.

Figure 16:
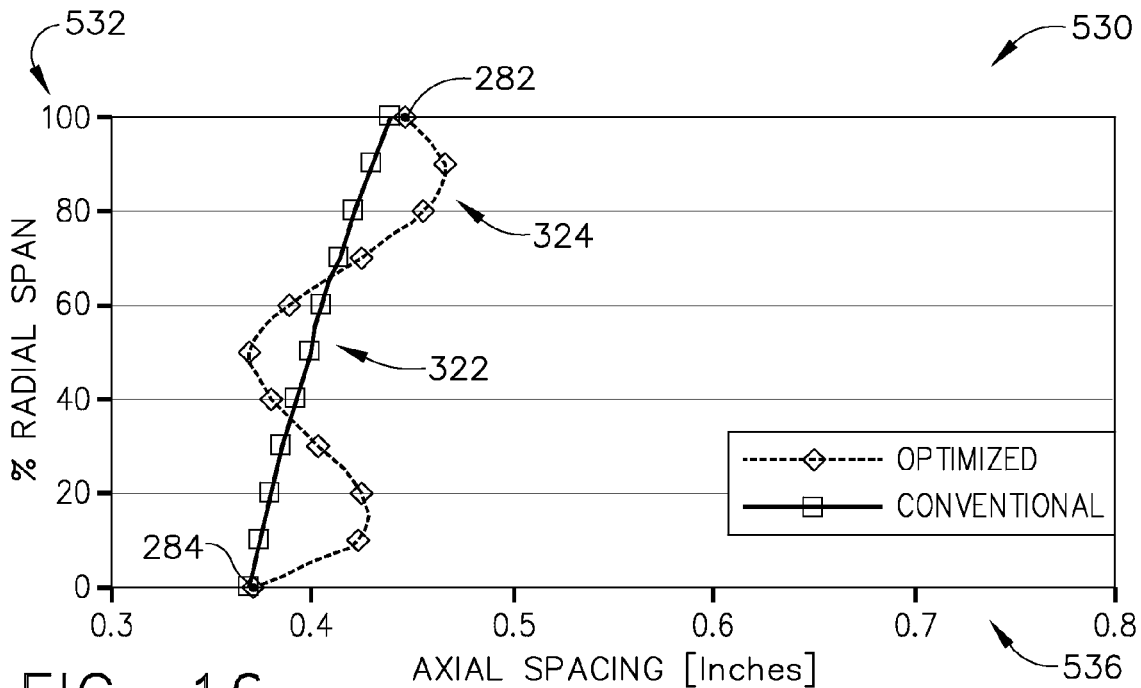
FIG. 16 is a graph illustrating exemplary axial spacing values defined within the second stage of the turbine assembly shown in FIG. 13.

FIG. 16 is a graph 530 illustrating exemplary axial spacing values between a vane 86 and a blade 95 within a second stage 37 of turbine assembly 20. More specifically, exemplary axial spacing values 324 between vane 86 and blade 95 are plotted graphically wherein the ordinate 532 of graph 530 represents a percent of radial span of the vane and blade airfoils, and the abscissa 536 of graph 530 represents the axial spacing, in inches, at a specific radial span location. For illustrative purposes, a solid line 322 presents an amount of axial spacing associated with a conventional stator vane. Accordingly, at root portion 284, represented as a radial span of 0%, the axial spacing value 324 is approximately equal to 0.38 inches. The axial spacing 324 increases from root portion 284 to a radial span of approximately 15%. The axial spacing 324 decreases from 15% span location to a radial span of approximately 50%. The axial spacing 324 increases from the 50% span location to a radial span of approximately 90%. The axial spacing 324 then decreases from the 90% span location to the tips of the vane and blade airfoils. Accordingly, in the exemplary embodiment, the axial spacing 324 between blade 95 and vane 86 has three axial spacing changes defined at the 15% span, the 50% span, and the 90% span.

Figure 17:
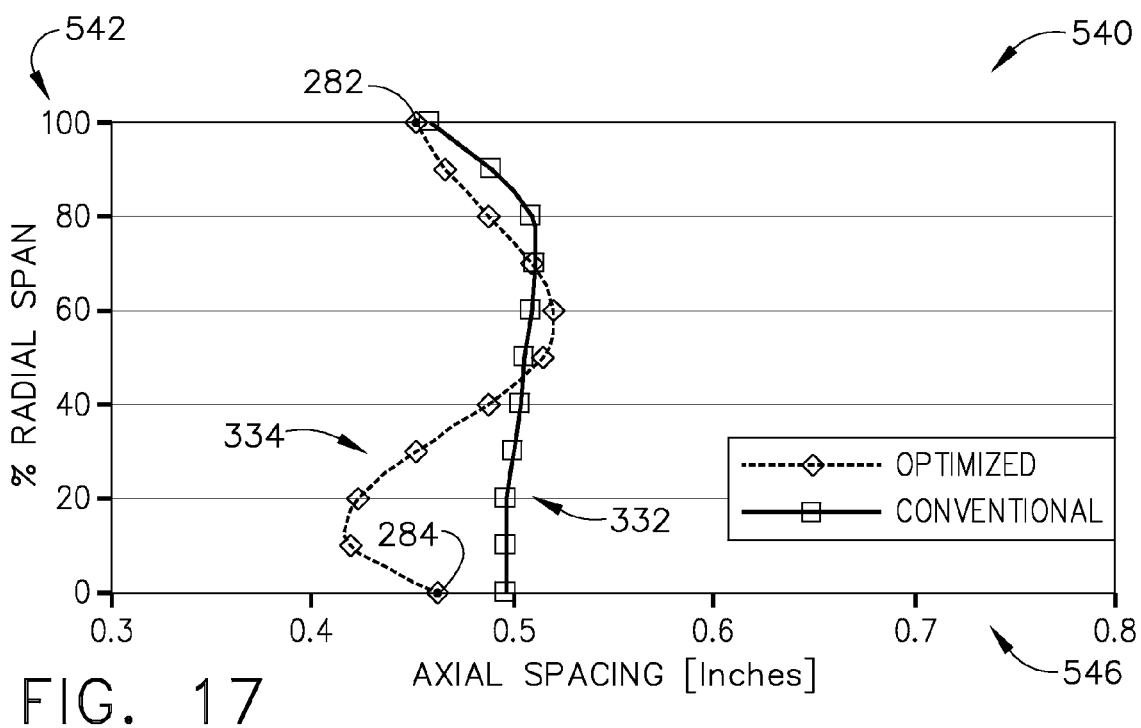
FIG. 17 is a graph illustrating exemplary axial spacing values defined between the second and third stages of the turbine assembly shown in FIG. 13.

FIG. 17 is a graph 540 illustrating exemplary axial spacing values between second stage 37 and third stage 41, i.e., between blade 95 and immediately downstream vane 86. More specifically, the axial spacing values 334 between blade 95 and vane 86 are plotted graphically wherein the ordinate 542 of graph 540 represents a percent of radial span of the vane and blade airfoils, and the abscissa 546 of graph 540 represents the axial spacing, in inches, at a specific radial span location. For illustrative purposes, a solid line 332 presents an amount of axial spacing associated with a conventional stator vane. Accordingly, at root portion 284, represented as a radial span of 0%, the axial spacing value 334 is approximately equal to 0.46 inches. The axial spacing 334 decreases from root portion 284 to a radial span of approximately 15%. The axial spacing 324 increases from the 15% span location to a radial span of approximately 60%. The axial spacing 334 decreases from the 60% span location to tip portion 282. Accordingly, in the exemplary embodiment, the axial spacing 334 between blade 95 and vane 86 has two axial spacing changes defined at the 15% span and the 60% span.

Figure 18:
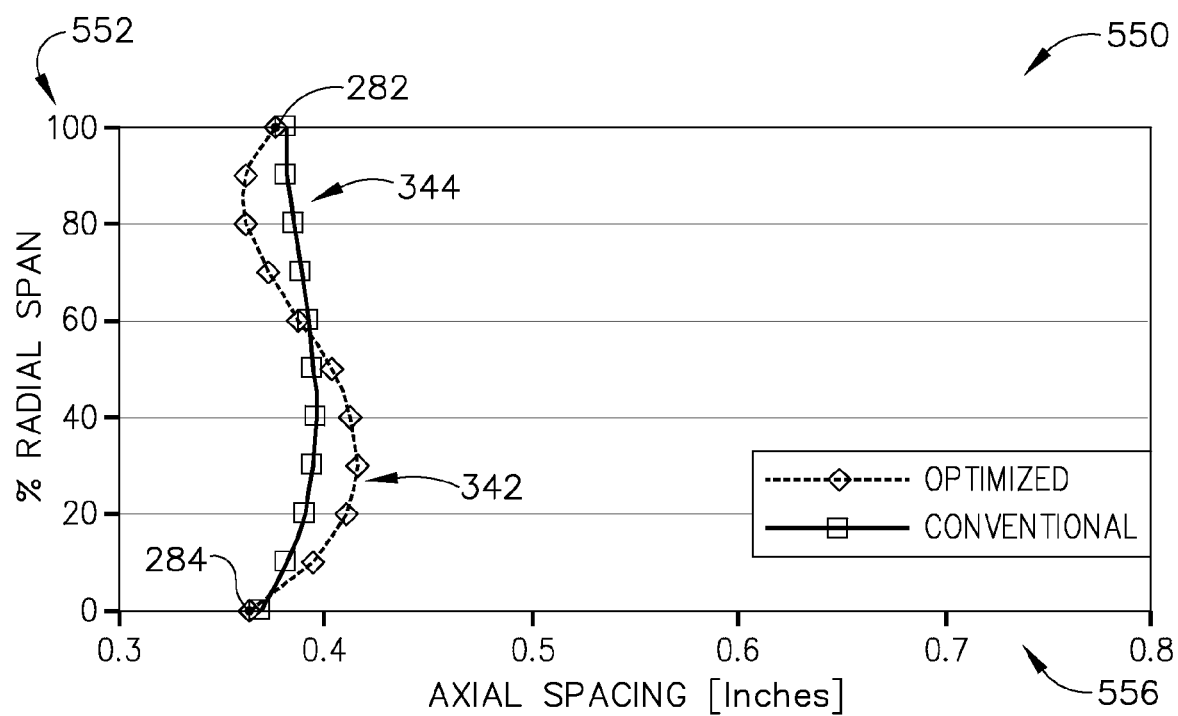
FIG. 18 is a graph illustrating exemplary axial spacing values defined within the third stage of the turbine assembly shown in FIG. 13.

FIG. 18 is a graph 550 illustrating exemplary axial spacing values between vane 86 and blade 83 within a third stage 41. More specifically, exemplary axial spacing values 342 between vane 86 and blade 83 are plotted graphically wherein the ordinate 552 of graph 550 represents a percent of radial span of the vane and blade airfoils, and the abscissa 556 of graph 550 represents the axial spacing, in inches, at a specific radial span location. For illustrative purposes, a solid line 340 presents an amount of axial spacing associated with a conventional stator vane. Accordingly, at root portion 284, represented as a radial span of 0%, the axial spacing 342 is approximately equal to 0.38 inches. The axial spacing 342 increases from root portion 284 to a radial span of approximately 30%. Axial spacing 342 decreases from 30% radial span to a radial span of approximately 85%. Axial spacing 342 increases from 85% radial span to tip portion 282. Accordingly, in the exemplary embodiment, the axial spacing 342 between blade 83 and vane 86 has two axial spacing changes defined at the 35% span and the 85% span.

Turbine assembly 20 facilitates reducing secondary airflows and improving aerodynamic efficiency.

More specifically, stator assemblies that include vanes 86 orientated with the various axial spacing described herein, facilitate reducing the amount and strength of secondary airflow characteristics associated with stator assembly. Reduced secondary airflows result in a higher nozzle exit pressure and a higher turbine efficiency. More specifically, the arrangement of turbine assembly 20 facilitates reducing secondary airflows that result in circumferential pressure losses. Based on computational fluid dynamics and quantitative analysis, the combination of varying axial spacings and the variable lean and the variable sweep in vanes 86 improves the overall group turbine efficiency as compared to the conventional design.

In one embodiment, a method for assembling a gas turbine engine is provided. The method includes coupling at least one stator assembly within the turbine engine. The at least one stator assembly includes at least one stator vane extending from an inner band within the gas turbine engine, wherein the stator vane extends from a root portion radially outward to a tip portion. The stator vane includes at least two lean directional changes defined between the root portion and the tip portion. The method also includes coupling at least one turbine blade assembly within the turbine engine. The turbine blade assembly includes at least one rotor blade in flow communication with the stator assembly such that an axial spacing is defined between the rotor blade and the stator vane. The axial spacing defined at one of the lean directional changes is wider than the axial spacing defined at the root portion.

Described herein is a turbine assembly that may be utilized in a wide variety of engines. In each embodiment and the described method, the turbine assembly has at least one stator vane with a variable lean and/or variable sweep, which facilitates weakening secondary airflows that may reduce the pressure in the turbine assembly and that can cause inefficiencies in the engine. As a result, the total pressure of the combustion gases exiting the turbine assembly may be increased and, consequently, the turbine efficiency may improve. Accordingly, turbine engine performance may be enhanced in a cost-effective and reliable manner with the turbine assembly described herein.

Exemplary embodiments of a stator vane and stator vane assembly for a gas turbine engine are described above in detail. The stator vane and stator vane assembly illustrated are not limited to the specific embodiments described herein, but rather, components of each stator vane and each stator vane assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    coupling at least one stator assembly within the turbine engine, wherein the at least one stator assembly includes at least one stator vane extending from an inner band within the gas turbine engine, wherein the stator vane extends in a first plane from a root portion radially outward to a tip portion and extends in a second plane between a leading edge and a trailing edge, and wherein the stator vane includes at least two lean directional changes defined between the root portion and the tip portion; and
    coupling at least one turbine blade assembly within the turbine engine, wherein the turbine blade assembly includes at least one rotor blade in flow communication with the stator assembly such that an axial spacing is defined between the rotor blade and at least one of the leading edge of the stator vane and the trailing edge of the stator vane, wherein the axial spacing defined at one of the lean directional changes is wider than the axial spacing defined at the root portion.

2. A method in accordance with claim 1 wherein coupling at least one stator assembly further comprises coupling at least one stator vane within the stator assembly that is formed with a negative lean adjacent the root portion and a positive lean adjacent the tip portion.

3. A method in accordance with claim 1 wherein coupling at least one stator assembly within the turbine engine further comprises coupling at least one stator vane in the stator assembly that includes a trailing edge formed with at least two lean directional changes defined between the root portion and a midpoint defined approximately halfway between the root portion and the tip portion.

4. A method in accordance with claim 1 wherein coupling at least one stator assembly within the turbine engine further comprises coupling at least one stator vane within the stator assembly that is formed with a cross-sectional area that converges from the root portion to a midpoint defined approximately halfway between the root portion and the tip portion.

5. A method in accordance with claim 1 wherein coupling at least one turbine blade assembly further comprises coupling at least one turbine blade assembly within the turbine engine such that the axial spacing includes at least three different axial spacing changes.

6. A method in accordance with claim 1 wherein coupling at least one stator assembly further comprises orienting the at least one stator vane within the gas turbine engine to facilitate reducing secondary airflows in the stator assembly.

7. A method in accordance with claim 1 wherein coupling at least one stator assembly within the turbine engine further comprises coupling at least one stator vane within the stator assembly that is configured to reduce horseshoe vortexes in the stator assembly.

8. A turbine assembly comprising:
    at least one stator assembly comprising a radially inner band and at least one stator vane extending radially outward from said inner band, said stator vane comprising an airfoil comprising a root portion adjacent said inner band and a tip portion, said airfoil further comprising at least one lean directional change defined between said root portion and said tip portion; and
    at least one turbine blade assembly comprising at least one rotor blade, said blade assembly coupled in flow communication with said stator assembly such that an axial spacing is defined therebetween, wherein the axial spacing defined adjacent to said at least one lean directional change is wider than the axial spacing defined adjacent to said root portion.

9. A turbine assembly in accordance with claim 8 wherein said stator vane further comprises a plurality of lean directional changes defined between said root portion and said tip portion.

10. A turbine assembly in accordance with claim 8 wherein said stator vane further comprises a midpoint defined approximately halfway between said root portion and said tip portion, and at least two lean directional changes defined between said root portion and said midpoint.

11. A turbine assembly in accordance with claim 8 wherein said at least one stator vane further comprises at least one converging portion and at least one diverging portion.

12. A turbine assembly in accordance with claim 8 wherein said axial spacing comprises at least three axial spacing changes.

13. A turbine assembly in accordance with claim 8 wherein said at least one stator vane configured to reduce at least one of a horseshoe vortex and a passage vortex generated within said at least one stator assembly.

14. A multi-stage turbine assembly comprising:
    a first stage comprising a first blade assembly coupled downstream from a first stator assembly, said stator assembly comprising at least one stator vane comprising an airfoil, said airfoil comprising a root portion, a tip portion, and at least one lean directional change and sweep directional change defined between said root portion and said tip portion, said first blade assembly comprising at least one rotor blade; and a second stage comprising a second blade assembly coupled downstream from a second stator assembly comprising at least one stator vane, said stator vane comprising an airfoil comprising a root portion, a tip portion, and at least one lean directional change and sweep directional change defined between said root portion and said tip portion, said second blade assembly comprising at least one second rotor blade, said first stage coupled upstream from said second stage such that an axial spacing is defined therebetween, said axial spacing comprising a plurality of axial spacing changes, wherein the axial spacing defined at the at least one lean directional change of the second stage is wider than the axial spacing defined at the root portion of the second stage.

15. A turbine assembly in accordance with claim 14 wherein at least one of said first stage and second stage stator vanes further comprises a plurality of lean directional changes defined between said root portion and said tip portion.

16. A turbine assembly in accordance with claim 14 wherein at least one of said first stage and second stage stator vanes further comprises a midpoint defined approximately halfway between said root portion and said tip portion, and at least two lean directional changes defined between said root portion and said midpoint.

17. A turbine assembly in accordance with claim 14 wherein at least one of said first stage and second stage stator vanes is formed with a converging portion and a diverging portion.

18. A turbine assembly in accordance with claim 14 wherein the axial spacing defined between said first stage and said second stage comprises at least three axial spacing changes.

19. A turbine assembly in accordance with claim 14 wherein said stator assembly facilitates reducing secondary airflows.

* * * * *